US011824715B2

(12) United States Patent
Zhang et al.

(10) Patent No.: US 11,824,715 B2
(45) Date of Patent: Nov. 21, 2023

(54) CONFIGURATION METHOD, RELATED APPARATUS, AND SYSTEM

(71) Applicant: HUAWEI TECHNOLOGIES CO., LTD., Shenzhen (CN)

(72) Inventors: Liya Zhang, Wuhan (CN); Wei Song, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/729,166

(22) Filed: Apr. 26, 2022

(65) Prior Publication Data

US 2022/0255794 A1  Aug. 11, 2022

Related U.S. Application Data

(63) Continuation of application No. PCT/CN2020/119068, filed on Sep. 29, 2020.

(30) Foreign Application Priority Data

Oct. 28, 2019 (CN) .......................... 201911032345.4

(51) Int. Cl.
G06F 15/177 (2006.01)
H04L 41/082 (2022.01)
H04L 41/0823 (2022.01)
H04L 41/08 (2022.01)
H04L 41/0893 (2022.01)

(52) U.S. Cl.
CPC ........ *H04L 41/082* (2013.01); *H04L 41/0836* (2013.01); *H04L 41/0886* (2013.01); *H04L 41/0893* (2013.01)

(58) Field of Classification Search
CPC .................... H04L 41/0836; H04L 41/0893
See application file for complete search history.

(56) References Cited

U.S. PATENT DOCUMENTS

| 7,054,924 B1* | 5/2006 | Harvey ................. H04L 67/125 |
| | | 709/219 |
| 9,450,817 B1 | 9/2016 | Bahadur et al. |
| 2003/0135596 A1* | 7/2003 | Moyer .................... H04L 67/34 |
| | | 709/246 |

(Continued)

FOREIGN PATENT DOCUMENTS

| CN | 101384086 A | 3/2009 |
| CN | 101610171 A | 12/2009 |

(Continued)

*Primary Examiner* — Wing F Chan
*Assistant Examiner* — Joseph R Maniwang
(74) *Attorney, Agent, or Firm* — Maier & Maier, PLLC

(57) ABSTRACT

A method includes obtaining a first service requirement related to a first device; determining, based on the first service requirement, a first host core model and at least one component hooked to the first host core model; generating a first packet based on the host core model and the at least one component; and configuring the first device based on the first packet. Because a configuration apparatus can run independently of a device that is in a service requirement, configuration can be completed on the device based on the service requirement when a service of the device is not broken. Difficulty in configuration can be effectively reduced by hooking the component to the host core model.

20 Claims, 7 Drawing Sheets

(56) References Cited

U.S. PATENT DOCUMENTS

| | | |
|---|---|---|
| 2010/0083232 A1 | 4/2010 | Chouinard et al. |
| 2019/0243665 A1 | 8/2019 | Bolik et al. |

FOREIGN PATENT DOCUMENTS

| | | |
|---|---|---|
| CN | 102033743 A | 4/2011 |
| CN | 104753696 A | 7/2015 |
| CN | 106446412 A | 2/2017 |
| CN | 106709619 A | 5/2017 |
| CN | 107239601 A | 10/2017 |
| CN | 108989066 A | 12/2018 |
| CN | 110007980 A | 7/2019 |

* cited by examiner

CONFIGURATION METHOD, RELATED APPARATUS, AND SYSTEM

CROSS-REFERENCE TO RELATED APPLICATIONS

This application is a continuation of International Application No. PCT/CN2020/119068, filed on Sep. 29, 2020, which claims priority to Chinese Patent Application No. 201911032345.4, filed on Oct. 28, 2019. The disclosures of the aforementioned applications are hereby incorporated by reference in their entireties.

TECHNICAL FIELD

The embodiments relate to the field of network technologies, and in particular, to a configuration method, a related apparatus, and a system.

BACKGROUND

A carrier's network usually includes devices provided by a plurality of vendors. These devices can run normally only after network configuration is performed. However, the devices of the plurality of vendors vary greatly. Therefore, in a conventional technology, configuration is usually performed in a full-customization mode.

During network configuration in the full-customization mode, a new service model is defined based on a plurality of dimensions such as an actual service requirement of a project, and devices, service types, and management parameters of various vendors that are involved in the project, and a mapping from the service model to a device is developed. Finally, configuration of the devices is completed based on the service model and the mapping from the service model to the device. In this way, networking is successfully completed.

However, in the full-customization mode, each device needs to be configured based on an actual situation of each project. Moreover, reuse is difficult to be implemented in different projects. Therefore, an independent branch needs to be developed for each project. Consequently, a lot of manpower and material resources are required for configuration and subsequent maintenance and upgrade.

SUMMARY

Embodiments provide a configuration method, a related apparatus, and a system. The configuration method includes: obtaining a first service requirement related to a first device; determining, based on the first service requirement, a first host core model and at least one component hooked to the first host core model; generating a first packet based on the host core model and the at least one component; and configuring the first device based on the first packet.

Because a configuration apparatus can run independently of a device that is in a service requirement, configuration, for example, expansion of a new service, can be completed on the device based on the service requirement when a service of the device is not broken. Difficulty in configuration can be effectively reduced by pre-creating a host core model and hooking a component to the host core model. In addition, the host core model may be reused in different projects. This can effectively reduce manpower and material resources required during configuration and facilitate subsequent maintenance and upgrade.

According to a first aspect, an embodiment provides a configuration method, including:

A configuration apparatus obtains a first service requirement related to a first device, where the first service requirement corresponds to the first device, and the first device may be a physical device or a virtual device. The configuration apparatus determines, based on the first service requirement, a first host core model and at least one component hooked to the first host core model, where the at least one component includes: a component model of the at least one component, a component constraint of the at least one component, and a component mapping of the at least one component, where the component model includes component information of the at least one component, and the component information includes a component parameter and a component name; the component constraint includes a scenario to which the at least one component is applicable and a constraint of the component parameter; and the component mapping includes a mapping from the at least one component to a first packet. The configuration apparatus generates the first packet based on the first host core model and the at least one component. The configuration apparatus configures the first device based on the first packet.

In this embodiment, after the configuration apparatus obtains the first service requirement related to the first device, the configuration apparatus determines, based on the first service requirement, the first host core model and the at least one component hooked to the first host core model, where the first host core model is a pre-generated host core model. The configuration apparatus generates the first packet based on the first host core model and the at least one component. The configuration apparatus configures the first device based on the first packet, to meet the first service requirement. Difficulty in configuration can be effectively reduced by using the pre-created host core model and hooking the component to the host core model.

With reference to the first aspect, in the embodiment of the first aspect, that the configuration apparatus determines, based on the first service requirement, a first host core model and at least one component hooked to the first host core model includes:

The configuration apparatus determines a first scenario based on the first service requirement, where the first scenario includes the component information of the at least one component required by the first service requirement and hook point information of the first host core model required by the first service requirement, where the at least one component is hooked to the first host core model based on the hook point information of the first host core model. The configuration apparatus determines, based on the first scenario, the first host core model and the at least one component hooked to the first host core model. The hook point information of the first host core model is described by using any one of a name-value pair, a character string, or a bit.

In this embodiment, after the configuration apparatus obtains the first service requirement, the configuration apparatus may determine the corresponding first scenario based on the first service requirement. The first scenario includes the component information of the at least one component required by the first service requirement and the hook point information of the first host core model required by the first service requirement. The configuration apparatus determines, based on the first scenario, the first host core model and the at least one component hooked to the first host core model. This can reduce difficulty in determining, by the configuration apparatus after obtaining the first service requirement, the corresponding first host core model and the corresponding at least one component hooked to the first host core model.

With reference to the first aspect, in the embodiment of the first aspect, before the configuration apparatus obtains the first service requirement related to the first device, the method further includes:

After the configuration apparatus determines, based on a service requirement, a component required by a currently created scenario and a host core model to which the component is hooked, the configuration apparatus determines hook point information of the host core model based on the component, where the hook point information of the host core model includes an insertion location of the host core model, a component name of the component and an instantiation identity of the component. In a process of creating the scenario, the configuration apparatus needs to generate the instantiation identity corresponding to the component for ease of using the determined component.

The configuration apparatus associates, based on the hook point information of the host core model and component information of the component, the instantiation identity of the component with a hook point that is of the host core model and via which the component is hooked; and updates the hook point information of the host core model. For example, the instantiation identity of the component is filled in the hook point via which the component is hooked to the host core model. After completing the foregoing steps, the configuration apparatus creates at least one scenario.

The configuration apparatus constructs a scenario set by using the at least one scenario, where the scenario set includes the first scenario.

The configuration apparatus creates a component set, where the component set includes the at least one component.

In this embodiment, the configuration apparatus determines, based on the service requirement, the components that need to be used in the created scenario and the host core model to which the components are hooked. The configuration apparatus selects the hook point that is of the host core model and via which the component needs to be hooked. The configuration apparatus creates the at least one scenario based on the hook point information of the host core model and the at least one component, and constructs the scenario set by using the at least one scenario, where the scenario set includes the first scenario. After the configuration apparatus obtains the first service requirement, the configuration apparatus determines the first scenario in the scenario set based on the first service requirement. Because the configuration apparatus may pre-create the scenario and the component, after obtaining the service requirement, the configuration apparatus may determine a corresponding scenario from the pre-created scenario set, determine a corresponding component from the pre-created component set, and determine a corresponding host core model and a corresponding component based on the scenario. Further, the configuration apparatus generates a packet used to configure a device corresponding to the actual service requirement. This can greatly reduce difficulty in customization and reduce manpower and material resources.

With reference to the first aspect, in the embodiment of the first aspect, the method further includes:

The configuration apparatus determines the component model and the component constraint of the first component (the at least one component may be referred to as the first component) based on the first component in the first scenario, where the component constraint of the first component specifies a data source of a first component parameter (any parameter in the component parameter) in the component model. The configuration apparatus obtains the first component parameter of the at least one component based on the component constraint of the at least one component. The configuration apparatus packages the first component parameter and the instantiation identity of the first component based on the first component and the first component parameter, to generate a first component packet. The configuration apparatus combines the first component parameter of the first component and other content of the first component in the first component packet with the first host core model based on the first component packet (the first component packet includes the instantiation identity of the at least one component and the first component parameter), the first host core model, and the hook point information (a first hook point) of the first host core model, where a finally generated packet is referred to as a first northbound packet. The configuration apparatus generates a southbound packet framework based on a mapping relationship from the first host core model to the first device. Because the configuration apparatus differs from the first device, the southbound packet framework that can be mapped to the first device needs to be generated based on the first host core model. The configuration apparatus translates the first component parameter in the first northbound packet based on the component mapping of the at least one component; generates a partial packet based on a translation result of the first component parameter; and inserts the partial packet into the southbound packet framework based on the southbound packet framework, to generate the first packet.

In this embodiment, after determining the at least one component and the first host core model to which the at least one component is hooked, the configuration apparatus generates the first packet by performing the foregoing steps. This improves practicability of this solution.

A second aspect of the embodiments provides a configuration apparatus. The configuration apparatus has a function of implementing the method according to any one of the first aspect or the possible implementations of the first aspect. The function may be implemented by hardware or may be implemented by hardware executing corresponding software. The hardware or software includes one or more modules corresponding to the foregoing function, for example, includes an obtaining unit, a processing unit, and a configuration unit.

A third aspect of the embodiments provides a configuration apparatus. The configuration apparatus includes at least one processor, where the at least one processor is configured to be coupled to a memory and read and execute instructions in the memory. The processor performs the method according to any one of the first aspect or the possible implementations of the first aspect.

A fourth aspect of the embodiments provides a computer-readable storage medium storing one or more computer-executable instructions. When the computer-executable instructions are executed by a processor, the processor performs the method according to any one of the first aspect or the possible implementations of the first aspect.

A fifth aspect of the embodiments provides a computer program product storing one or more computer-executable instructions. When the computer-executable instructions are executed by a processor, the processor performs the method according to any one of the first aspect or the possible implementations of the first aspect.

A sixth aspect of the embodiments provides a chip system. The chip system includes a processor, configured to support a configuration apparatus in implementing the function according to any one of the first aspect or the possible implementations of the first aspect. In a possible implementation, the chip system may further include a memory. The memory is configured to store program instructions and data that are necessary for a terminal device. The chip system may include a chip or may include a chip and another discrete component.

A seventh aspect of the embodiments provides a configuration system. The configuration system includes a configuration apparatus, where the configuration apparatus performs the method according to any one of the first aspect or the possible implementations of the first aspect.

It can be understood from the foregoing solutions that the embodiments have at least the following advantages:

obtaining the first service requirement related to the first device; determining, based on the first service requirement, the first host core model and the at least one component hooked to the first host core model; generating the first packet based on the host core model and the at least one component; and configuring the first device based on the first packet.

Because the configuration apparatus can run independently of a device that is in the service requirement, configuration, for example, expansion of a new service, can be completed on the device based on the service requirement when a service of the device is not broken. Difficulty in configuration can be effectively reduced by pre-creating a host core model and hooking a component to the host core model. In addition, the host core model may be reused in different projects. This can effectively reduce manpower and material resources required during configuration and facilitate subsequent maintenance and upgrade.

DETAILED DESCRIPTION OF THE EMBODIMENTS

Figure 1A:
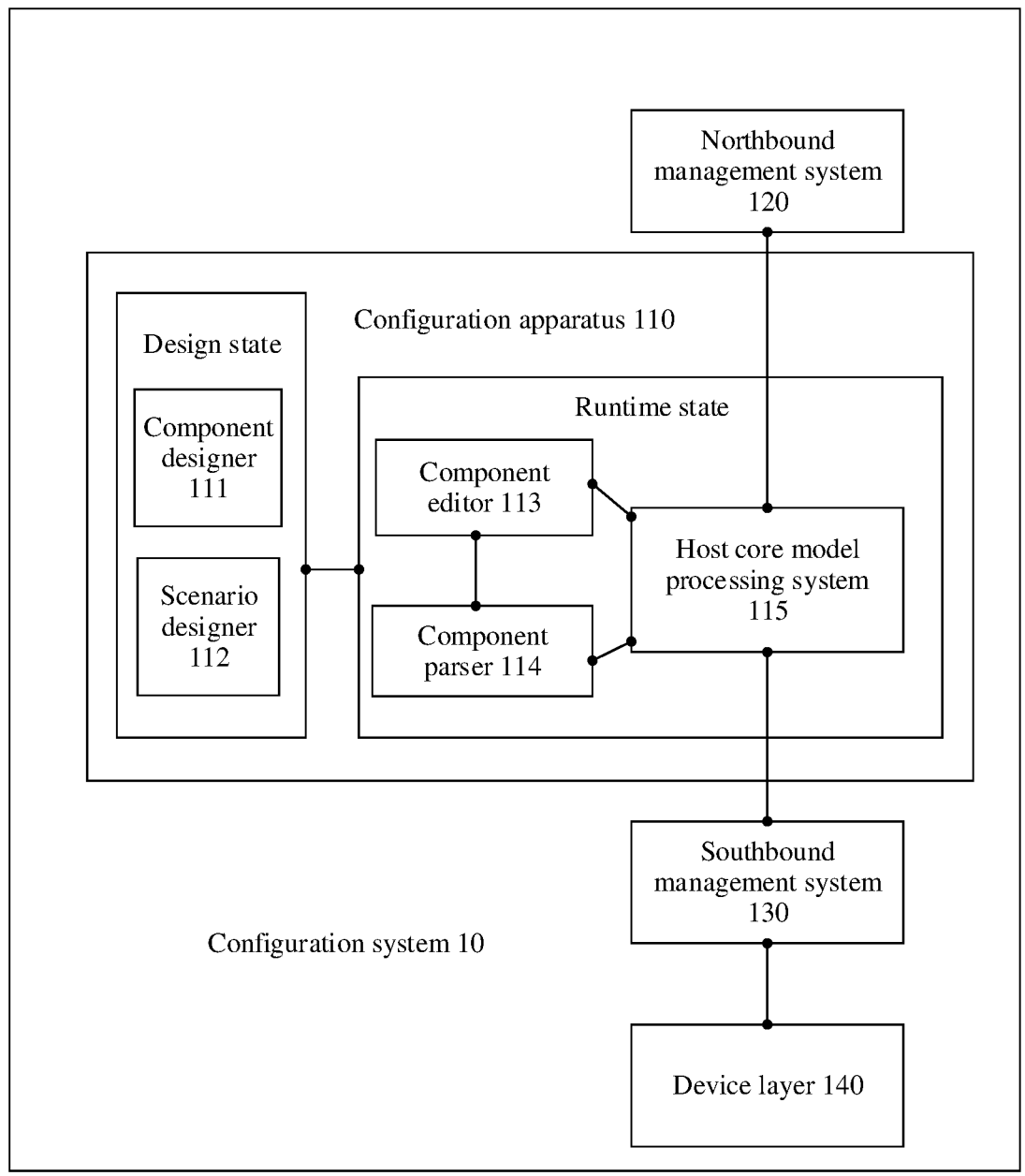
FIG. 1*a* is a schematic diagram of a system architecture of a configuration system according to an embodiment.

Embodiments provide a configuration method, a related apparatus, and a system, to complete configuration, for example, expansion of a new service, on a device based on a service requirement when a service of the device is not broken. Difficulty in configuration can be effectively reduced by pre-creating a host core model and hooking a component to the host core model. In addition, the pre-created host core model may be reused in different projects. This can effectively reduce manpower and material resources required during configuration and facilitate subsequent maintenance and upgrade.

The following describes the embodiments with reference to accompanying drawings.

In the embodiments and accompanying drawings, the terms "first", "second", and the like are intended to distinguish similar objects but do not necessarily indicate a specific order or sequence. It should be understood that the terms used in such a way are interchangeable in proper circumstances. This is merely a discrimination manner that is used when objects having a same attribute are described in the embodiments. In addition, the terms "include", "have", and any other variants thereof are intended to cover the non-exclusive inclusion, so that a process, method, system, product, or device that includes a series of units is not necessarily limited to those units, but may include other units not expressly listed or inherent to such a process, method, product, or device.

The configuration method, the related apparatus, and the system provided in the embodiments may be applied to packet processing scenarios such as carrier network management. The carrier network management is used as an example for description. In a conventional technology, a carrier manages a network by using an operations support system (OSS). The OSS is a necessary support platform for development and operation of telecommunications services. The OSS includes parts such as network management, system management, billing, business, accounting and customer services. The systems are organically integrated through a uniform information bus. The operations support system includes an operation and maintenance center and a network management center. The operations support system is responsible for checking and managing communication quality and operation of the entire network and recording and collecting situations of various data during operation of the entire network. The operations support system is connected to all devices in the entire network and monitors and controls the devices. For example, when the operations support system is divided based on a service model, the operations support system includes: a work order system, a multi-domain service management system (super controller) and a single-domain management system (domain controller). A northbound interface and a southbound interface are disposed on the multi-domain service management system. For example, the northbound interface is an interface used for a vendor or a carrier to access and manage a network, namely, an interface provided for the northbound. Interface programming is used in the network to develop various application systems to manage managed objects. A management method is to collect and analyze various data generated during operation of the managed objects. The southbound interface is an interface configured to manage a single domain controller or a device of another vendor, namely, an interface provided for the southbound. The southbound interface provides a function of managing a network element of the another vendor and supports interface protocols in a plurality of forms.

The multi-domain service management system can obtain data required by the southbound single-domain management system from the northbound work order system by using packets. The multi-domain service management system processes the packets, and then sends the packets to the southbound single-domain management system. Therefore, a northbound service model, for example, the work order system, may also be referred to as a northbound management system; and a southbound service system, for example, the single-domain management system, may also be referred to as a southbound management system.

A configuration apparatus and a configuration system provided in the embodiments have a plurality of implementations. The configuration apparatus, replacing the multi-domain service management system, may be directly connected to the northbound management system via the northbound interface and connected to the southbound management system via the southbound interface, to implement related functions of the configuration method provided in the embodiments. Alternatively, the configuration apparatus may be connected to the multi-domain service management system in the OSS in an external hooking manner, to implement related functions of the configuration method provided in the embodiments. For example, for the implementation in which the configuration apparatus replaces the multi-domain service management system, refer to the following description of an embodiment in FIG. 1a. For the implementation in which the configuration apparatus is connected to the multi-domain service management system in the external hooking manner, refer to the following description of an embodiment in FIG. 1b.

1. The configuration apparatus replaces the multi-domain service management system.

FIG. 1a is a schematic diagram of a system architecture of a configuration system according to an embodiment. The configuration method provided in the embodiments is applicable to a configuration system 10. The configuration system 10 includes a configuration apparatus 110, a northbound management system 120, a southbound management system 130 and a device layer 140. The configuration apparatus 110 may be divided into a design state and a runtime state based on an execution action of each module. The design state includes a component designer 111 and a scenario designer 112. The runtime state includes a component editor 113, a component parser 114 and a host core model processing system 115.

The configuration apparatus 110 may be divided into two parts, that is, the design state and the runtime state, from a perspective of service logic. The design state is responsible for component design and extension of a host core model in a specific scenario. The runtime state is responsible for generating a graphical user interface to obtain a component parameter, parsing a component-related packet, and inserting, into the host core model, a packet obtained through component mapping.

The component designer 111 is configured to provide a design platform of a component template. A component includes a component model, a component constraint and a component mapping.

The scenario designer 112 is configured to hook a required component to a hook point opened by a host core model based on a service requirement. In this way, the host core model can be extended and various service requirements can be met.

The component editor 113 is configured to generate a general component management interface based on a component model and a component constraint when determining, based on the component constraint, that a component parameter needs to be externally input for a component, where the externally input component parameter is received via the component management interface. The component management interface may be an object-oriented general graphical user interface (, GUI) in a JsonViewer format.

The component parser 114 is configured to obtain a packet of a component through translation based on a component mapping and insert the packet of the component into a packet of a host core model.

The host core model processing system 115 includes a service logic processing system of a kernel object and a related port. In the embodiments, the kernel object of an actual service is expressed in a form of a host core model (host core model), where the host core model is used to provide a kernel model of unstructured data. For example, for an L3 virtual private network (VPN) service, related kernel objects such as virtual routing and forwarding (VRF) are made into a host core model. The host core model provides hook points for components of various related services.

The host core model processing system 115 is configured to manage the southbound and northbound management systems through connection and exchange packets with the southbound and northbound management systems. The host core model may be created by the host core model processing system 115 or may be configured in the host core model processing system 115 after being created by another external device. This is not limited herein. The host core model processing system 115 generates a southbound packet framework based on the host core model.

The northbound management system 120 is a management system running above the host core model processing system 115 and may be a business support system (BSS) of a carrier.

The southbound management system 130 is responsible for managing the device layer 140 in a local domain. The southbound management system 130 may include one or more of a conventional element management system (EMS), a network management system (NMS), a controller, or the like. The southbound management system 130 provides a Json packet-based RESTful interface for the northbound (the host core model processing system 115) and provides a command line-based or Netconf-based device-level interface for the southbound (the device layer 140).

The device layer 140 is a network that includes network element-level devices of a plurality of technologies and a plurality of vendors and is responsible for forwarding a data packet of a service flow. The device layer 140 may include, but is not limited to, the network element-level devices such as a passive optical network (PON), an optical transport network (OTN), an IP network element or a microwave network element.

In the configuration system 10 corresponding to FIG. 1a, the component designer 111 in the configuration apparatus 110 may pre-create a component based on a service requirement. The scenario designer 112 may also pre-create a scenario (one or more pre-created scenarios are referred to as a scenario set) based on the service requirement, where the scenario includes component information of at least one component required by the service requirement and related information of a host core model required by the service requirement, for example, an identifier of the host core model and hook point information of the host core model. The host core model determined during creation of the scenario is pre-created. When the configuration system 10 obtains a service requirement, the configuration apparatus 110 may perform the following actions based on the service requirement, to implement the service requirement: (1) selecting, based on the service requirement, an appropriate scenario from the scenario set pre-created by the scenario designer 112; and selecting, based on the selected scenario, an appropriate component from a component set pre-created by the component designer 111; (2) creating an appropriate scenario by using the scenario designer 112 based on the service requirement; and selecting an appropriate component from the component designer 111 based on the scenario; or (3) creating an appropriate scenario by using the scenario designer 112 based on the service requirement; and creating an appropriate component by using the component designer 111 based on the service requirement.

The host core model processing system 115 in the configuration apparatus 110 determines a corresponding host core model based on the scenario. Each module in the runtime state in the configuration apparatus 110 generates a first packet based on the selected component and the host core model. The configuration apparatus 110 forwards the first packet to the southbound management system 130 by using the host core model processing system 115. In an optional implementation, the first packet is used to configure the southbound management system 130, and the southbound management system 130 uses the first packet to manage the device layer 140. In another optional implementation, the southbound management system 130 forwards the first packet to the device layer 140, where the first packet is used to configure a device at the device layer 140. Because the first packet is transmitted to the southbound management system 130 via a southbound interface, the first packet may also be referred to as a first southbound packet.

2. The configuration apparatus is connected to the multi-domain service management system in the external hooking manner.

Figure 1B:
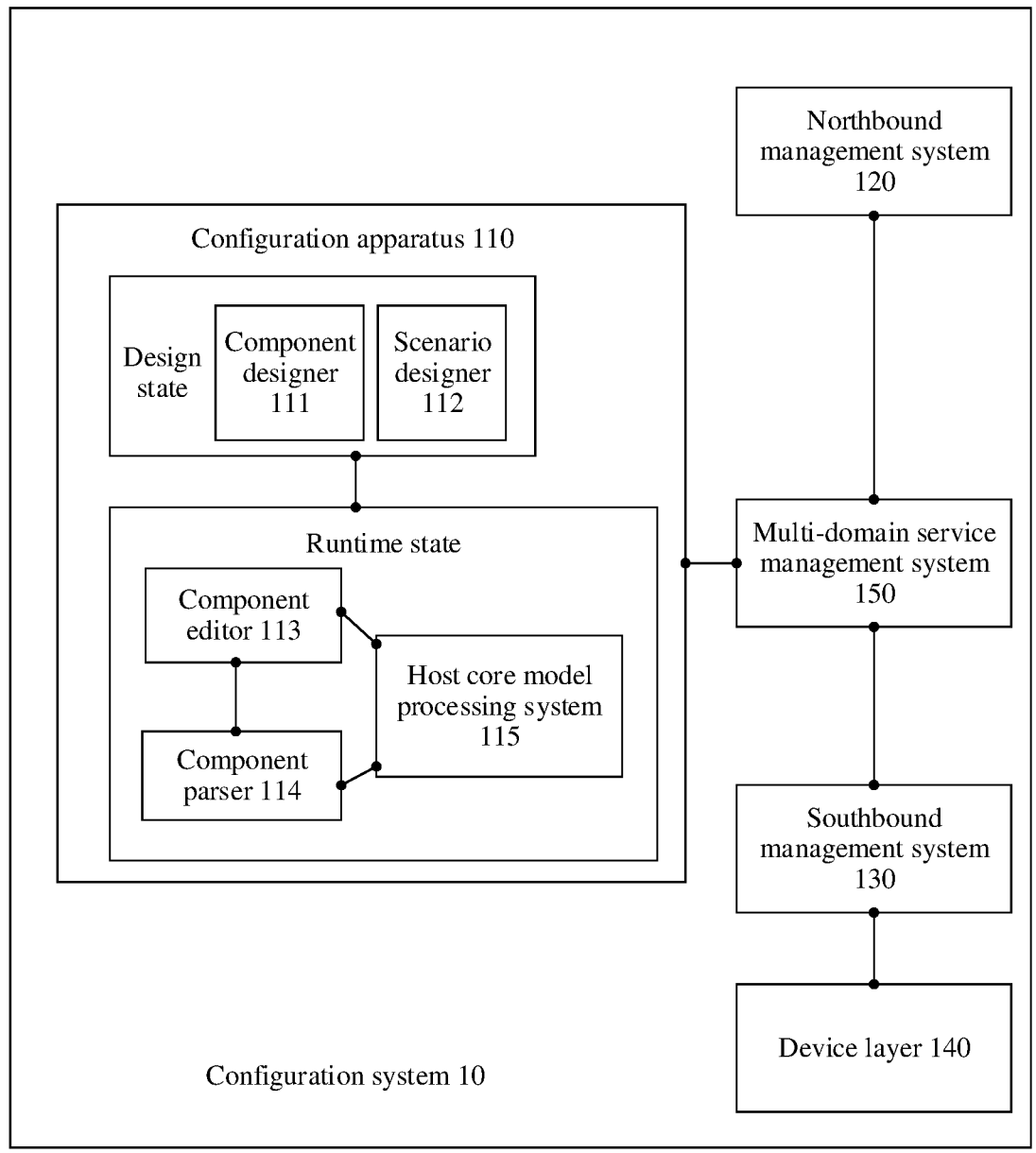
FIG. 1*b* is a schematic diagram of a system architecture of another configuration system according to an embodiment.

Compared with the configuration system in FIG. 1a, a configuration system 10 corresponding to FIG. 1b further includes a multi-domain service management system 150. An operations support system (OSS) in a conventional technology includes the multi-domain service management system 150, a northbound management system 120, a southbound management system 130 and a device layer 140. A function of the multi-domain service management system 150 is similar to that of a multi-domain service management system (super controller) in the conventional technology. In the configuration system 10 corresponding to FIG. 1b, after generating a first packet based on a service requirement, a configuration apparatus 110 sends the first packet to the multi-domain service management system 150, and the multi-domain service management system 150 configures the southbound management system 130 by using the first packet.

Other modules in the configuration system 10 corresponding to FIG. 1b are similar to the modules in the configuration system 10 corresponding to FIG. 1a, and details are not described herein again.

Figure 2:
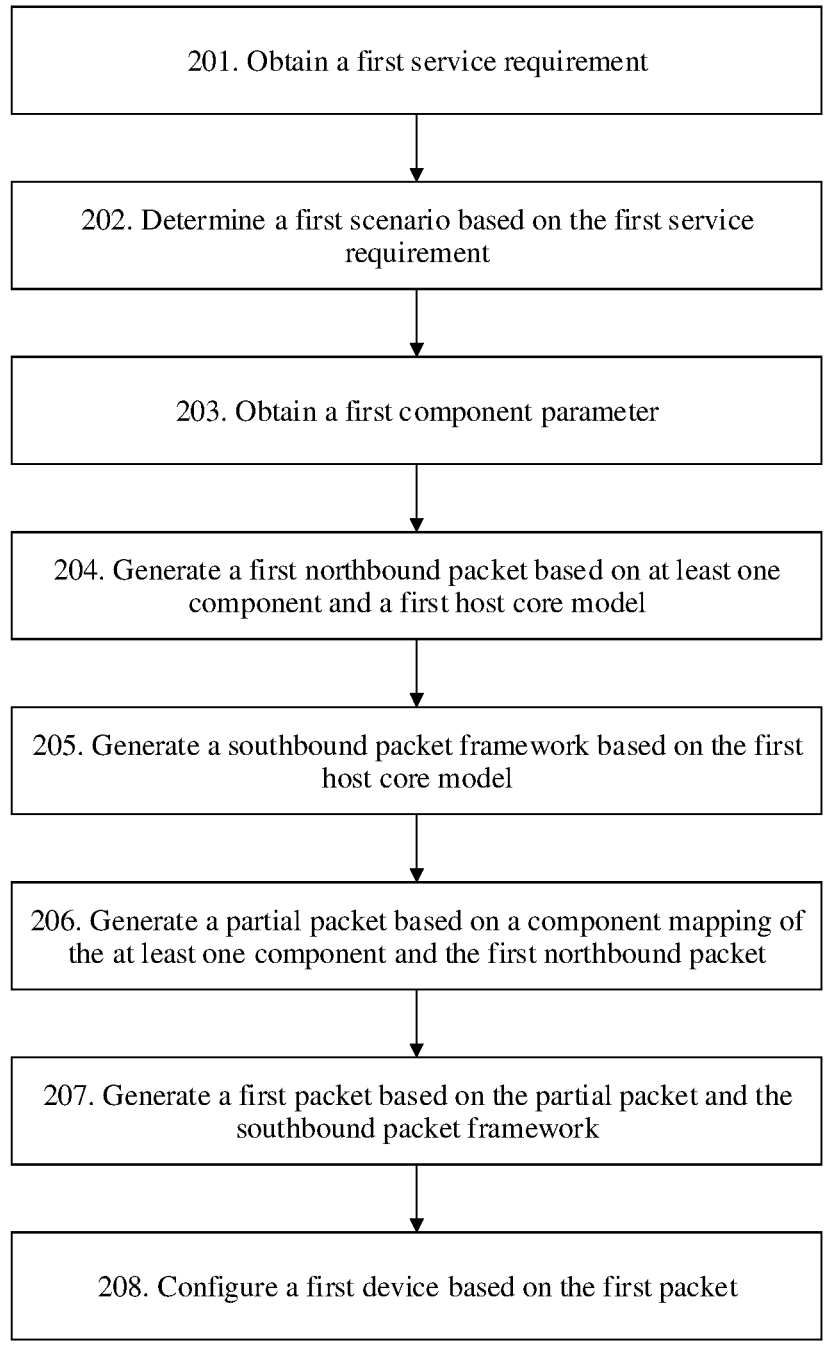
FIG. 2 is a schematic diagram of an embodiment of a configuration method according to embodiments.

FIG. 2 is a schematic diagram of an embodiment of a configuration method according to the embodiments. Based on the system architecture of the configuration system shown in FIG. 1a or FIG. 1b, the configuration method provided in this embodiment includes the following steps.

201. Obtain a First Service Requirement.

In this embodiment, the configuration apparatus obtains the first service requirement, where the first service requirement corresponds to a first device. The first service requirement may be various services of a configuration system, where the configuration system has a feature of converting a packet. In this embodiment the first service requirement is, for example, newly adding an internet protocol version 6 (IPv6) feature of a device, "configuring an enterprise private line for internet access", "configuring a home IP", or "requesting an enterprise VPN service to support a BGPImportRoute feature".

In this embodiment, an example in which the first service requirement is the "requesting an enterprise VPN service to support a BGPImportRoute feature" is used for description. In this case, the first device corresponding to the first service requirement is an enterprise VPN service server. A border gateway protocol (BGP) is a routing protocol that is of an autonomous system and that runs above a transmission control protocol (TCP).

The BGP is an external gateway protocol and is usually deployed between autonomous systems (for example, deployed between two carriers or between two large enterprise networks). The following uses an example to describe a route import feature (BGPImportRoute) of the BGP routing protocol: Two enterprises (or carriers) A and B have deployed different interior gateway protocol (IGP) routing protocols, and the BGP is used to connect the two enterprises (or carriers) A and B. The enterprise (or the carrier) B internally builds a hypertext transfer protocol (HTTP) website. In this case, when a user of the enterprise (or the carrier) A needs to access the website, the route import feature (BGPImportRoute) of the BGP routing protocol needs to be involved.

It should be noted that the first device may be a physical device or a virtual device.

This is not limited herein.

202. Determine a First Scenario based on the First Service Requirement.

In this embodiment, after the configuration apparatus obtains the first service requirement, the configuration apparatus determines the first scenario based on the first service requirement. The first scenario includes component information of at least one component required by the first service requirement and hook point information of a first host core model required by the first service requirement, where the at least one component is hooked to the first host core model based on the hook point information of the first host core model. For example, the at least one component is hooked to a hook point of the first host core model. For example, when a quantity of the at least one component is 1, the at least one component is hooked to a first hook point of the first host core model. It should be noted that, when a plurality of components need to be hooked to the host core model, the components may be hooked to the host core model via a same hook point or may be separately hooked to the host core model via a plurality of hook points. This is not limited herein. The hook point information may be described by using a JsonPath language or an Xpath language. For example, when the first host core model is a VPN node (VPNNode), the hook point information of the first host core model may be in a S.VPN.VPNNode.HookPoints format.

In this embodiment, for ease of description, an example in which the at least one component is a first component is used for description. It should be noted that the first component may be one component or may be a plurality of components. This is not limited herein.

The following describes the first scenario by using the example in which the first service requirement is "requesting an enterprise VPN service to support a BGPImportRoute feature". The configuration apparatus determines the first scenario based on the first service requirement. In the first scenario, the first host core model may be the VPN node.

In addition to determining the first host core model (for example, the first host core model and the hook point information of the first host core model) required by the first service requirement, the first scenario further determines a component name of the first component required by the first service requirement and an instantiation identity of the first component.

The first component may be a component whose component name is "BGPImportRoute". To facilitate use of the "BGPImportRoute" component, an instantiation (instantiate) identity (ID) may be configured for the component. Instantiation refers to a process of creating an object with a class in object-oriented programming, in other words, instantiation also refers to a process of specifying an abstract concept class as a physical object of the class.

Figure 3A:
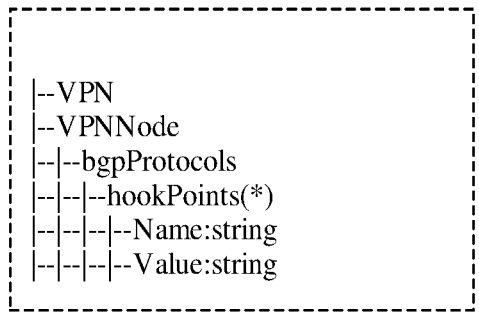
FIG. 3*a* is a schematic diagram of a host core model according to an embodiment.

For ease of understanding, refer to FIG. 3a. FIG. 3a is a schematic diagram of a host core model according to an embodiment. In an example in FIG. 3a, a first host core model is a VPN node. In the first host core model, a subnode "bgpProtocols (routing protocol)" exists under the VPN node. A hook point "hookPoints(*)" exists in "bgpProtocols", and "hookPoints(*)" is also referred to as an insertion location of the first host core model. The configuration apparatus may insert a first component into "bgpProtocols" based on "insertion location of the first host core model": "VPNNode/bgpProtocols" in hook point information of the first host core model. Here, "hookPoints(*)" includes "Name: string" and "Value: string", where "Name: string" is used to fill in a component name, and "Value: string" is used to fill in an instantiation identity of the component and an externally input packet of the component.

It should be noted that the first scenario may be generated after the configuration apparatus obtains the first service requirement. Alternatively, the configuration apparatus may pre-create a scenario set before obtaining the first service requirement; and after obtaining the first service requirement, the configuration apparatus determines, based on the first service requirement, that a corresponding scenario in the pre-created scenario set is the first scenario. This is not limited herein.

The hook point information of the first host core model is described by using any one of a name-value pair, a character string, or a bit.

203. Obtain a First Component Parameter.

In this embodiment, after determining the first scenario, the configuration apparatus determines a component model and a component constraint of the first component based on the first component in the first scenario. The component information of the component may be determined based on the component model, where the component information includes a component parameter and the component name. In addition to determining a scenario (for example, the first scenario) to which the first component is applicable, the component constraint is further used to determine a constraint of the component parameter included in the component. For example, the component constraint is used to constrain whether each component parameter in the component can be modified, a data source of the component parameter, a data type of the component parameter, and the like. The component constraint also specifies the scenario (or a device) to which the component is applicable. For example, if the component constraint specifies that the device to which the component is applicable is "Huawei", the component cannot be applied to a "Cisco" device.

The configuration apparatus determines the component model and the component constraint of the first component based on the first component in the first scenario, where the component constraint of the first component specifies the data source of the first component parameter (any parameter in the component parameter) in the component model. For example, the data source of the component parameter includes external data or internal data, where the external data is obtained from outside of the configuration system, for example, from a graphical user interface "FromGUI", and the internal data of the component parameter is specified to be obtained from inside of the configuration system, for example, from a resource pool "FromPOOL". The component constraint further specifies the data type of the component parameter. For example, based on the component constraint of the first component, it is specified that a unit of the first component parameter is millisecond. When the first component parameter externally input into the configuration apparatus is one second, the configuration apparatus converts the one second to 1000 milliseconds based on the component constraint of the first component.

In a possible implementation, a specific manner of obtaining the first component parameter is described by using an example in which the component constraint of the first component specifies that the source of the first component parameter is "FromGUI". After the configuration apparatus determines the first scenario, the host core model processing system 115 in the configuration apparatus determines the first component parameter based on the component model of the first component and determines that the data source of the first component parameter is "FromGUI" based on the component constraint of the first component. In this case, the host core model processing system 115 sends the instantiation identity of the first component to the component editor 113, and the component editor 113 searches for a component (a to-be-searched object is a component set generated by the component generator 111, where each component has a corresponding instantiation identity) based on the instantiation identity and determines that a component whose component parameter currently needs to be obtained is the first component. Further, a component management interface is generated based on the component constraint that is of the first component and that is cached in the component editor 113. In this embodiment, the component management interface may be displayed in a form of a graphical user interface, where the graphical user interface is used to receive component parameters that are externally input. The component parameters that need to be externally input are specified by the component constraint of the first component. When the component constraint of the first component specifies that the first component parameter needs to be obtained by using the graphical user interface, the component management interface generated by the component editor 113 is used to obtain the first component parameter. For example, the graphical user interface may be a JS object notation (javascript object notation or JSON) editing interface.

It should be noted that, when a plurality of components are hooked to the first host core model, the host core model processing system 115 sends instantiation identities corresponding to the components to the component editor 113, so that the component editor 113 determines, based on the instantiation identities, which components are hooked to the first host core model and which component parameters of which components need to be obtained by the component editor 113.

If the component constraint specifies that the data source of the first component parameter is from the resource pool "FromPOOL", the component editor 113 obtains the first component parameter from the resource pool (POOL) of the configuration apparatus.

The example in which the first service requirement is "requesting an enterprise VPN service to support a BGPImportRoute feature" is used to describe a process of obtaining the first component parameter. The component constraint of the first component specifies: a parameter name of the first component parameter is "routePolicyName" (a name of a route side chain); and correspondingly, a parameter value of the first component parameter is "policy1", and a data source of "routePolicyName" is "FromGUI". The configuration apparatus obtains "policy1" by using the graphical user interface (the graphical user interface allows a user to enter a specific component parameter) and determines a routing policy for the "enterprise VPN service" based on a value of "policy1" entered by the user.

After the configuration apparatus obtains the first component parameter, the configuration apparatus packages the first component parameter and the instantiation identity of the first component based on the first component and the first component parameter to generate a first component packet. In a possible implementation, after obtaining the first component parameter, the component editor 113 generates the first component packet, and sends the first component packet to the host core model processing system 114.

204. Generate a First Northbound Packet based on the at least one Component and the First Host Core Model.

In this embodiment, after the configuration apparatus obtains the first component parameter, the configuration apparatus generates the first northbound packet based on the at least one component (the first component), the first component parameter and the first host core model. Here, the configuration apparatus combines the first component parameter of the first component and other content of the first component in the first component packet with the first host core model based on the first component packet (the first component packet includes the instantiation identity of the at least one component and the first component parameter), the first host core model and the hook point information (the first hook point) of the first host core model, where a finally generated packet is referred to as the first northbound packet.

Figure 3B:
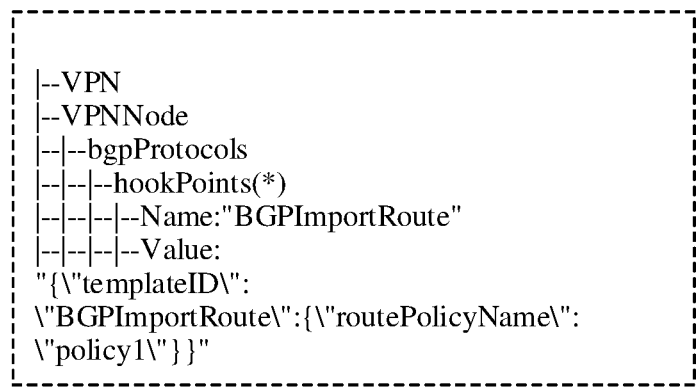
FIG. 3*b* is a schematic diagram of a first northbound packet according to an embodiment.

For ease of understanding, refer to FIG. 3b. FIG. 3b is a schematic diagram of a first northbound packet according to an embodiment. FIG. 3b shows a fragment of a first northbound packet in FIG. 3a, that is, a fragment of the at least one component (the first component "BGPImportRoute") hooked on the first host core model. In FIG. 3b, specific content of the first hook point "hookPoints(*)" is "{\"nemplateID\": \"BGPImportRoute\"{\"routePolicyName\"}\"\"policy1\"}}", where "BGPImportRoute" is an input component name of the first component, "routePolicyName" is an input parameter name of a first component parameter, and "policy1" is an input parameter value of the first component parameter. It should be noted that the first northbound packet may further include a parameter on which the first component depends in addition to the content shown in FIG. 3b, where the parameter on which the first component depends is also hooked to the first host core model. FIG. 3b is used as an example. A parameter on which the first component depends is "A", where the parameter "A" is used to determine whether to deliver the first component parameter "policy1". When the parameter "A=true", the first component parameter is delivered; or when the parameter "A=false", the first component parameter is not delivered.

In an optional implementation, after receiving the first component packet sent by the component editor 113, the host core model processing system 115 generates the first northbound packet based on the at least one component (the first component parameter and the other content of the first component in the first component packet) and the first host core model.

205. Generate a Southbound Packet Framework based on the First Host Core Model.

In this embodiment, because the configuration apparatus differs from the first device, the southbound packet framework that can be mapped to the first device needs to be generated based on the first host core model. Two possibilities exist after the southbound management system receives a first packet: A first possibility is that the southbound management system directly forwards the first packet to the first device, and a second possibility is that the southbound management system manages the first device based on an indication of the first packet (to meet the first service requirement of the first device). Therefore, the southbound packet framework generated by the configuration apparatus based on a mapping relationship from the first host core model to the first device may be a southbound packet framework generated by the configuration apparatus based on a mapping relationship from the first host core model to the southbound management system that manages the first device. Further, the southbound management system processes a mapping relationship between the southbound packet framework and the first device.

An example in which the first host core model is "VPNNode" is used. The following mapping relationship exists between the first host core model and the southbound management system that manages the first device: The first host core model "VPNNode . . . " corresponds to "vpn instance . . . " in the southbound management system. The southbound packet framework generated by the host core model processing system 115 based on the first host core model includes "vpn instance". Here, southbound packet frameworks (an L3 VPN and a VRF packet) corresponding to the first device are generated based on host core models (a VPN and the VPN node).

It should be noted that a sequence of performing step 204 and step 205 is not limited herein. Step 204 may be performed before step 205. Alternatively, step 205 may be performed before step 204.

206. Generate a Partial Packet based on a Component Mapping of the at least one Component and the First Northbound Packet.

In this embodiment, the partial packet is generated based on the component mapping of the at least one component (the first component) and the first northbound packet after step 204. Here, each component parameter, including the first component parameter, of the first component in the first northbound packet is translated based on the component mapping of the first component; and the partial packet is generated based on a translation result of the component parameter. The component mapping of the first component may be a mapping script file. The mapping script file records each relative path that is in the southbound packet framework and that is mapped to each component parameter of the first component (or a hook point that is for the first component and that is in the southbound packet framework). The first northbound packet is translated to obtain the partial packet, so that the first device (or the southbound management system managing the first device) may identify related content that is of the component and that is recorded in the first northbound packet.

For example, the component mapping of the first component records a location or a uniform resource locator (URL) in which the first component is inserted into the southbound packet framework, where the location or the uniform resource locator may be described in a Json format, and the mapping script file in which the component mapping is located may be described by using Freemarker.

In an optional implementation, after receiving the first northbound packet generated by the host core model processing system 115, the component parser 114 translates, based on the component mapping of the first component (which may be the mapping script file of the first component), each component parameter (including the first component parameter) of the first component in the first northbound packet. The partial packet is generated based on the translation result. The component parser 114 may parse the mapping script file by using JsonPath (the relative path in the mapping script file is recorded in an Xpath form).

207. Generate the First Packet based on the Partial Packet and the Southbound Packet Framework.

In this embodiment, the configuration apparatus inserts the partial packet into the southbound packet framework based on the partial packet, the southbound packet framework and the relative path in the southbound packet framework (or the hook point for the first component in the southbound packet framework), to generate the first packet.

In an optional implementation, the component parser 114 generates the first packet based on the partial packet and the southbound packet framework. The component parser 114 sends the first packet to the host core model processing system 115, and the host core model processing system 115 forwards the first packet to the southbound management system 130.

Because the first packet needs to be forwarded by the host core model processing system 115 to the southbound management system 130, the first packet may also be referred to as a first southbound packet.

In another optional implementation, after the component parser 114 sends the first packet to the host core model processing system 115, the host core model processing system 115 forwards the first packet to the multi-domain service management system 150. The multi-domain service management system 150 forwards the first packet to the southbound management system 130, and the southbound management system 130 forwards the first packet to the device layer 140 (the first device), or the southbound management system 130 uses the first packet to manage the device layer 140 (the first device). Alternatively, after the host core model processing system 115 forwards the first packet to the multi-domain service management system 150, the multi-domain service management system 150 uses the first packet to manage the southbound management system 130, where the southbound management system 130 manages the first device.

208. Configure the First Device Based on the First Packet.

In this embodiment, in an optional implementation, after the component parser 114 in the configuration apparatus sends the first packet to the host core model processing system 115, the host core model processing system 115 forwards the first packet to the southbound management system 130. The southbound management system 130 forwards the first packet to the device layer 140 (the device layer 140 includes the first device) and configures the first packet for the first device based on the first service requirement or uses the first packet to manage the first device at the device layer 140, to meet the first service requirement.

In another optional implementation, after the component parser 114 sends the first packet to the host core model processing system 115, the host core model processing system 115 forwards the first packet to the multi-domain service management system 150. The multi-domain service management system 150 forwards the first packet to the southbound management system 130, and the southbound management system 130 forwards the first packet to the device layer 140 (the first device), or the southbound management system 130 uses the first packet to manage the device layer 140 (the first device). Alternatively, after the host core model processing system 115 forwards the first packet to the multi-domain service management system 150, the multi-domain service management system 150 uses the first packet to manage the southbound management system 130, where the southbound management system 130 manages the first device, so that the first service requirement is met.

In this embodiment, because the configuration apparatus can run independently of a device that is in a service requirement, configuration, for example, expansion of a new service, can be completed on the device based on the service requirement when a service of the device is not broken. Difficulty in configuration can be effectively reduced by pre-creating a host core model and hooking a component to the host core model. In addition, the pre-created host core model may be reused in different projects. This can effectively reduce manpower and material resources required during configuration and facilitate subsequent maintenance and upgrade.

The foregoing embodiment describes "(1) selecting, based on the service requirement, an appropriate scenario from the scenario set pre-created by the scenario designer 112; and selecting, based on the selected scenario, an appropriate component from a component set pre-created by the component designer 111". The following describes in detail how the configuration apparatus pre-creates a scenario and creates a component.

(1). Component Creation

The configuration apparatus determines a component model, a component constraint and a component mapping of at least one component based on a service requirement. The component model includes component information of the at least one component, where the component information includes a component parameter and a component name. The component constraint includes a scenario to which the at least one component is applicable and a constraint of the component parameter included in the component. The component mapping includes a mapping from the at least one component to a southbound packet, where the southbound packet is a packet that needs to be sent to a device corresponding to the service requirement to meet the service requirement.

Figure 4:
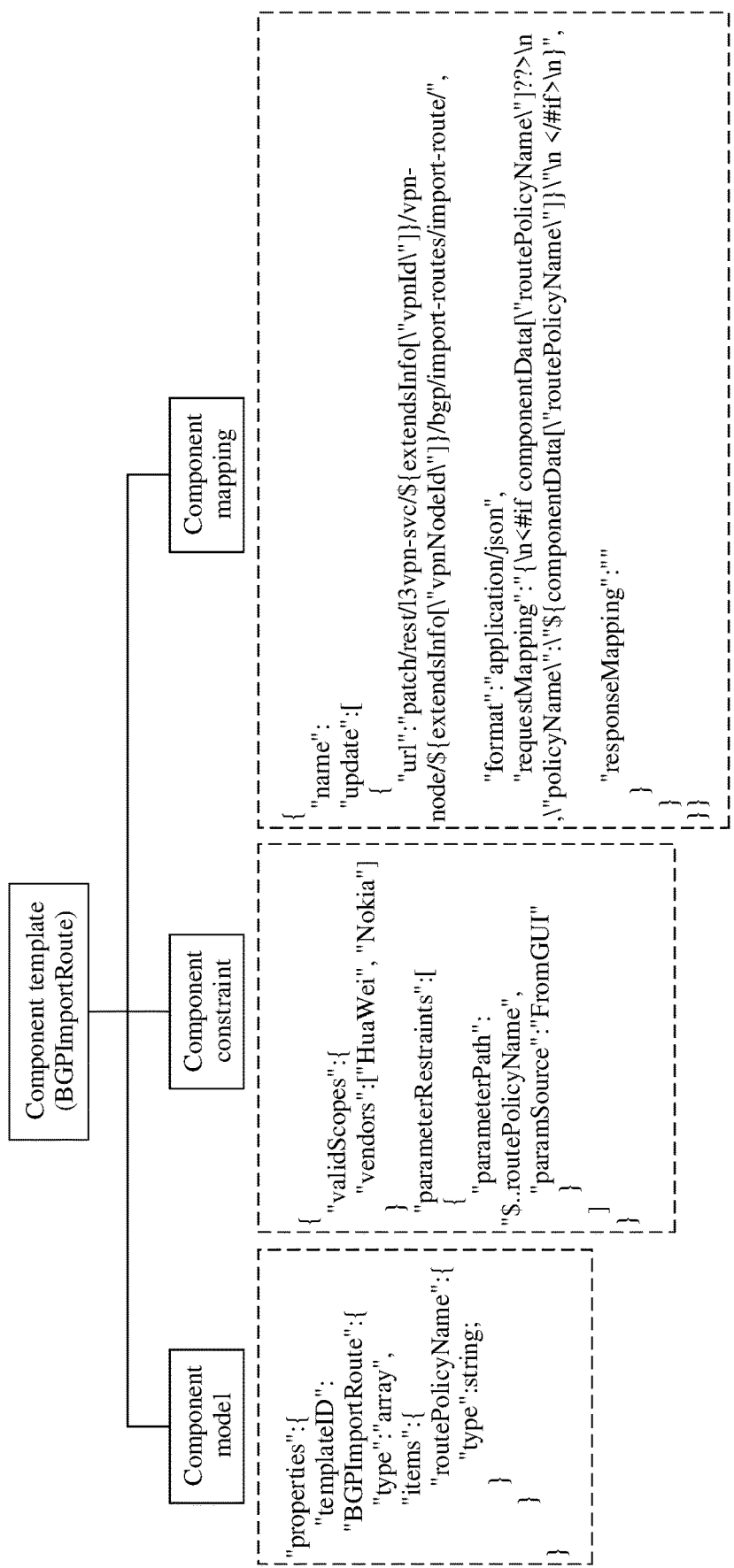
FIG. 4 is a schematic diagram of a template of a component according to an embodiment.

With reference to the accompanying drawings, the following describes a template of a component created by the configuration apparatus. FIG. 4 is a schematic diagram of a template of a component according to an embodiment. The component shown in FIG. 4 is "BGPImportRoute".

The component "BGPImportRoute" is used as an example to describe three parts in the component, namely, a component model, a component constraint and a component mapping.

The component model describes a component name and each component parameter. For example, the component model is described by using a "JsonSchema" format. It should be noted that another format may alternatively be used for description, and this is not limited herein. After "templateID", the component name "BGPImportRoute" of the component is described. Each component parameter of the component and a data type of the component parameter are specified after the component name "BGPImportRoute". For example, ""type":"array"" specifies that the data type of the component parameter described after is "array". After ""type":"array"", the component includes a component parameter "items", where a parameter name "routePolicy- Name" of a first component parameter of the component is described after the component parameter "items", and the data type of "routePolicyName" is specified as ""type": string"". It should be noted that other component parameters (not shown in FIG. 4) may be further described in the component model. It should be noted that the component model may alternatively be described in formats such as "Yaml", and this is not limited herein.

The component constraint describes the scenario to which the component is applicable, a service type and CRUD (creation (Create), read (Read), update (Update) and deletion (Delete)) attributes of the component parameter. In the embodiment, a "Json" format is used in the component constraint for description. "validScopes" describes the scenario to which the component is applicable (that is, a device to which the component is applicable). For example, ""vendors": ["HuaWei", "Nokia"]" specifies that devices to which the component "BGPImportRoute" is applicable are "HuaWei" and "Nokia". After "parameterRestraints", a constraint list of the component parameter. For example, for a component parameter "$ . . . routePolicyName", a data source of the component parameter is ""paramSource:"FromGUI"", and it indicates that the component parameter needs to be entered from a GUI.

The component mapping is described by using a "Json+Freemarker" format. It should be noted that another format may alternatively be used for description, and this is not limited herein. ""name":"update"" describes a modification interface of a southbound management system to which the component is mapped, namely, "update". "url . . . " is a corresponding path of the southbound management system or a start "title" of a corresponding command line in a southbound packet framework. A command of the southbound management system can be found by using "url . . . ". "format": " . . . /json"" indicates that a southbound packet is in the "Json" format. "request . . . "routePolicyName" . . . " describes a relative path that is in the southbound packet and to which the first component parameter "routePolicyName" is mapped. "responseMapping . . . " describes whether the southbound packet has a returned packet. As specified in FIG. 4, the southbound packet corresponding to the component "BGPImportRoute" does not have the returned packet.

After completing compiling the component model, the component constraint and the component mapping of the component, the configuration apparatus may release the component. In this case, creation of the component is completed. For example, the component designer 111 in the configuration apparatus may create the component.

(2). Scenario Creation

Figure 5:
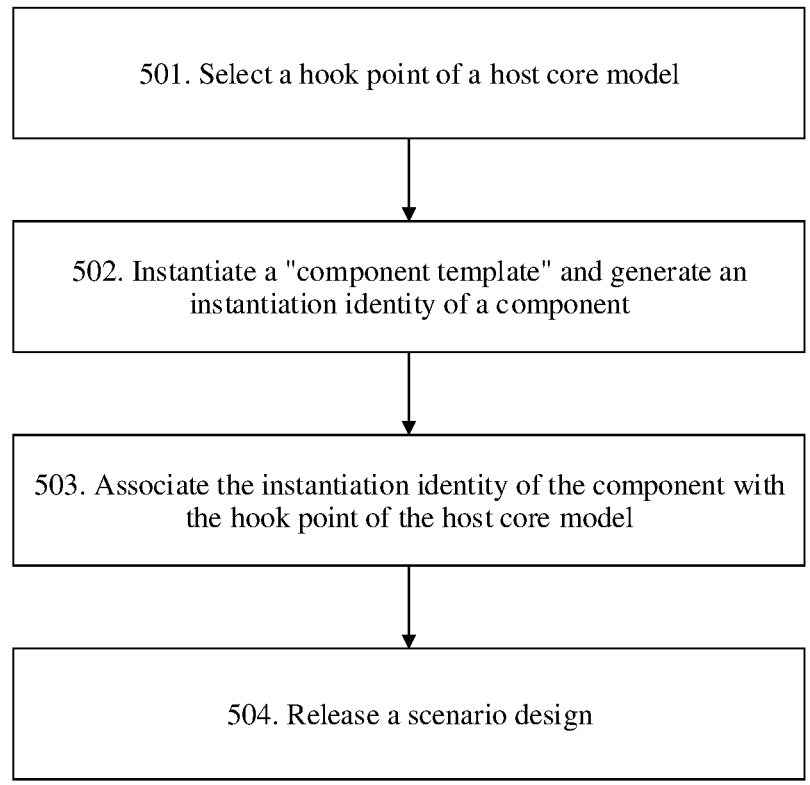
FIG. 5 is a schematic flowchart of creating a scenario according to an embodiment.

The configuration apparatus determines, based on a service requirement, components that need to be used in a created scenario and a host core model to which the components are hooked. For ease of understanding, refer to FIG. 5. FIG. 5 is a schematic flowchart of creating a scenario according to an embodiment.

Step 501. Select a hook point of a host core model.

In step 501, after the configuration apparatus determines, based on a service requirement, a component required by a currently created scenario and a host core model to which the component is hooked, the configuration apparatus selects the hook point that is of the host core model and via which the component needs to be hooked. Hook point information that describes the hook point may be described by using a model positioning language, where the model positioning language may be JsonPath or Xpath. For example, hook point information in a host core model "VPNNode" may be in a ".VPN.VPNNode.HookPoints" format.

Step 502. Instantiate a "component template" and generate an instantiation identity of the component.

In step 502, in a process of creating the scenario, the configuration apparatus needs to generate the instantiation identity corresponding to the component for ease of using the determined component. In this step, the configuration apparatus generates the corresponding instantiation identity based on the component template of the component, where the instantiation identity is unique in the scenario. In addition, the configuration apparatus modifies a component constraint of the component based on an actual service requirement.

Step 503. Associate the instantiation identity of the component with the hook point of the host core model.

In step 503, the configuration apparatus associates the instantiation identity of the component with the hook point that is of the host core model and via which the component is hooked and updates the hook point information of the host core model. In the step, the instantiation identity of the component is filled in the hook point that is of the host core model and via which the component is hooked.

Step 504. Release a scenario design.

In step 504, after the foregoing steps are performed, the configuration apparatus releases the scenario design of the scenario and completes creation of the scenario. The scenario includes the hook point information of the host core model and component information of at least one component.

It should be noted that the foregoing steps may be performed by the scenario designer 112 in the configuration apparatus.

In this embodiment, the configuration apparatus may pre-create the scenario based on the service requirement, and one or more pre-created scenarios form a scenario set. After the configuration apparatus obtains the actual service requirement, the configuration apparatus may select, from the scenario set, a scenario that is the most appropriate for the service requirement and determines a corresponding host core model and a corresponding component based on the scenario. Further, the configuration apparatus generates a packet used to configure a device corresponding to the actual service requirement. This can greatly reduce difficulty in customization and reduce manpower and material resources.

The foregoing describes the solutions provided in the embodiments from a perspective of the method. It can be understood that the configuration apparatus includes a corresponding hardware structure and/or software module for performing each function, to implement the foregoing functions. A person skilled in the art should be easily aware that, in combination with the examples of modules and algorithm steps described in the embodiments, the embodiments may be implemented by hardware or a combination of hardware and computer software. Whether a function is performed by hardware or hardware driven by computer software depends on particular applications and design constraints of the solutions. A person skilled in the art may use different methods to implement the described functions for each particular application, but it should not be considered that the implementation goes beyond the scope of the embodiments.

In the embodiments, the configuration apparatus may be divided into functional modules based on the foregoing method examples. For example, each functional module may be obtained through division based on each corresponding function, or two or more functions may be integrated into one processing unit. The integrated module may be implemented in a form of hardware or may be implemented in a form of a software functional module. It should be noted that division into the modules is an example and is merely logical function division in the embodiments. In an actual implementation, another division manner may be used.

Figure 6:
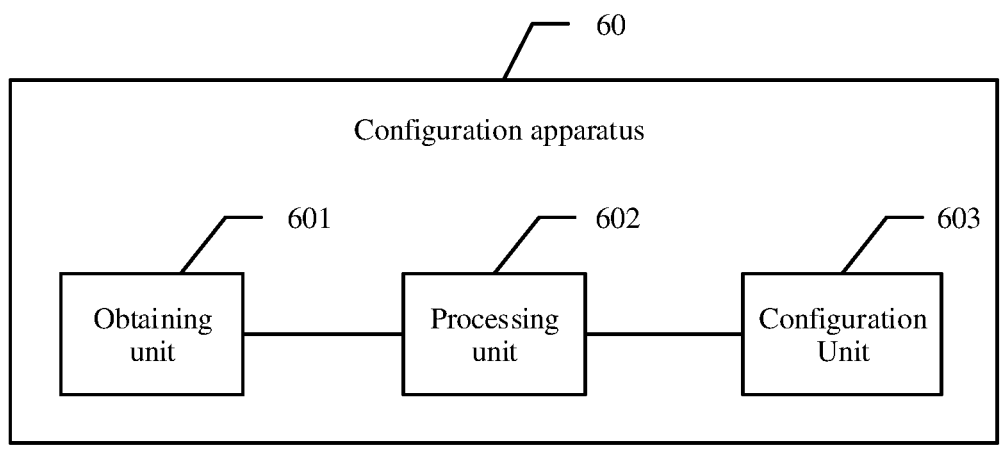
FIG. 6 is a schematic diagram of a structure of a configuration apparatus according to the embodiments.

The following describes the configuration apparatus in this application in detail. FIG. 6 is a schematic diagram of an embodiment of a configuration apparatus 60. The configuration apparatus 60 includes: an obtaining unit 601, configured to obtain a first service requirement related to a first device;

a processing unit 602, configured to:
  determine, based on the first service requirement, a first host core model and at least one component hooked to the first host core model, and
  generate a first packet based on the first host core model and the at least one component; and
a configuration unit 603, configured to configure the first device based on the first packet.

An embodiment of the configuration apparatus 60 *n* may include:

The at least one component includes a component model of the at least one component, a component constraint of the at least one component and a component mapping of the at least one component, where the component model includes component information of the at least one component, and the component information includes a component parameter and a component name; the component constraint includes a scenario to which the at least one component is applicable and a constraint of the component parameter; and the component mapping includes a mapping from the at least one component to the first packet.

An embodiment of the configuration apparatus 60 *n* may include: the processing unit 602 is configured to:
  determine a first scenario based on the first service requirement, where the first scenario includes the component information of the at least one component required by the first service requirement and hook point information of the first host core model required by the first service requirement, where the at least one component is hooked to the first host core model based on the hook point information of the first host core model; and
  determine, based on the first scenario, the first host core model and the at least one component hooked to the first host core model.

An embodiment of the configuration apparatus 60 may include: the processing unit 602 is further configured to:
  determine a host core model and a component based on a service requirement;
  determine hook point information of the host core model based on the component, where the hook point information of the host core model includes an insertion location of the host core model, a component name of the component, and an instantiation identity of the component;
  create at least one scenario based on the hook point information of the host core model and component information of the component; and
  construct a scenario set by using the at least one scenario, where the scenario set includes the first scenario.

An embodiment of the configuration apparatus 60 may include: the processing unit 602 is configured to:
  determine the first scenario in the scenario set based on the first service requirement.

An embodiment of the configuration apparatus 60 may include: the processing unit 602 is further configured to:
  obtain a first component parameter of the at least one component based on the component constraint of the at least one component.

An embodiment of the configuration apparatus 60 may include: the processing unit 602 is configured to:
  generate a first component packet based on the at least one component and the first component parameter;
  generate a first northbound packet based on the first component packet, the first host core model, and the hook point information of the first host core model;
  generate a southbound packet framework based on a mapping relationship from the first host core model to the first device, and
  generate the first packet based on the first northbound packet, the component mapping of the at least one component and the southbound packet framework.

An embodiment of the configuration apparatus 60 may include: the processing unit 602 is configured to:
  generate a partial packet based on the component mapping of the at least one component and the first northbound packet; and insert the partial packet into the southbound packet framework based on the southbound packet framework, to generate the first packet.

An embodiment of the configuration apparatus 60 may include: the processing unit 602 is configured to:
  translate the first component parameter in the first northbound packet based on the component mapping of the at least one component; and
  generate the partial packet based on a translation result of the first component parameter.

An embodiment of the configuration apparatus 60 may include: the processing unit 602 is further configured to:
  create a component set, where the component set includes the at least one component.

An embodiment of the configuration apparatus 60 may include: the hook point information of the first host core model is described by using any one of a name-value pair, a character string, or a bit.

It should be noted that content, for example, information exchange between the units of the configuration apparatus 60 and execution processes thereof, is based on the same idea as the method embodiments, and therefore brings the same effects as the method embodiments. For the specific content, refer to the foregoing description in the method embodiments. Details are not described herein again.

Figure 7:
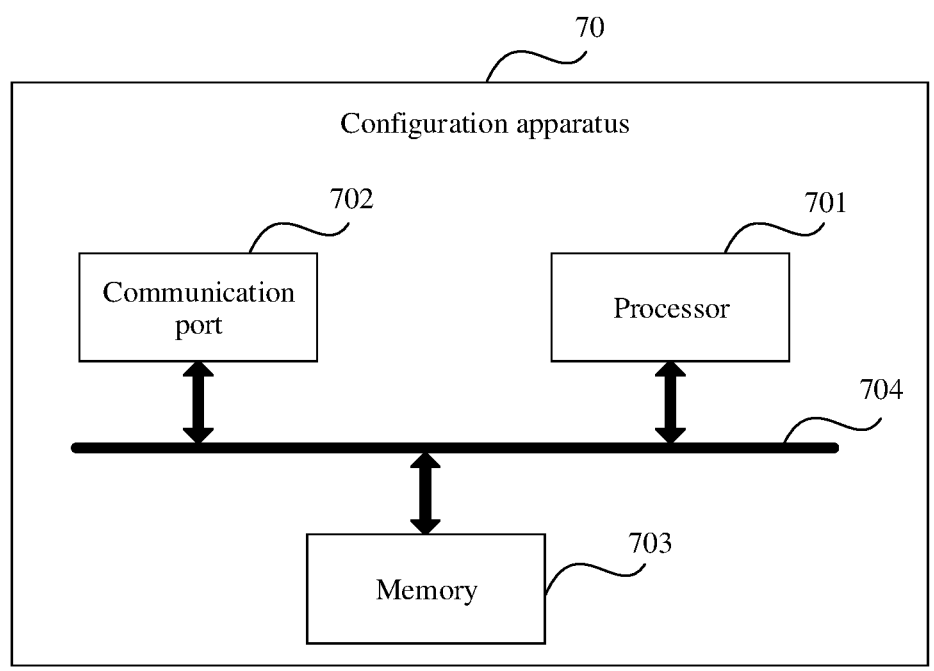
FIG. 7 is a schematic diagram of another structure of a configuration apparatus according to an embodiment.

FIG. 7 is a schematic diagram of another structure of a configuration apparatus 70 according to an embodiment. The configuration apparatus 70 includes: a processor 701, a communication port 702, a memory 703 and a bus 704. The processor 701, the communication port 702 and the memory 703 are connected to each other by using the bus 704. In this embodiment, the processor 701 is configured to control and manage an action of the configuration apparatus 70. For example, the processor 701 is configured to perform a function performed by the processing unit 602 in FIG. 6. The communication port 702 is configured to perform functions performed by the obtaining unit 601 and the configuration unit 603 in FIG. 6 and support the configuration apparatus 70 in communication. The memory 703 is configured to store program code and data of the configuration apparatus 70.

The processor 701 may be a central processing unit, a general-purpose processor, a digital signal processor, an application-specific integrated circuit, a field programmable gate array or another programmable logic device, a transistor logic device, a hardware component, or any combination thereof. The processor 701 may implement or execute various example logical blocks, modules and circuits described with reference to content in the embodiments. Alternatively, the processor may be a combination of processors implementing a computing function, for example, a combination of one or more microprocessors or a combination of a digital signal processor and a microprocessor. The bus 704 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 7, but this does not mean that there is only one bus or only one type of bus.

The embodiments further provide a chip system. The chip system includes a processor, configured to support the foregoing configuration apparatus in implementing functions related to the configuration apparatus, for example, receiving or processing the packet in the foregoing method embodiments. In a possible implementation, the chip system further includes a memory. The memory is configured to store program instructions and data that are necessary for the configuration apparatus. The chip system may include a chip or may include a chip and another discrete component.

In another embodiment, a computer-readable storage medium is further provided. The computer-readable storage medium stores computer-executable instructions. When at least one processor of a device executes the computer-executable instructions, the device performs the method described in some embodiments of FIG. 1 to FIG. 5.

In another embodiment, a computer program product is further provided. The computer program product includes computer-executable instructions. The computer-executable instructions are stored in a computer-readable storage medium. At least one processor of a device may read the computer-executable instructions from the computer-readable storage medium. The at least one processor executes the computer-executable instructions, so that the device performs the method described in some embodiments of FIG. 1 to FIG. 5.

In addition, it should be noted that the described apparatus embodiments are merely examples. The units described as separate parts may or may not be physically separate, and parts displayed as units may or may not be physical units, that is, may be located in one position, or may be distributed on a plurality of network units. Some or all of the modules may be selected based on actual requirements to achieve the objectives of the solutions of the embodiments. In addition, in the accompanying drawings of the apparatus embodiments, connection relationships between modules indicate that the modules have communication connections with each other, which may be implemented as one or more communication buses or signal cables.

Based on the description of the foregoing implementations, a person skilled in the art may clearly understand that the embodiments may be implemented by using software in combination with necessary universal hardware, or may be implemented by using dedicated hardware, including a dedicated integrated circuit, a dedicated CPU, a dedicated memory, a dedicated component, or the like. Generally, any function that can be completed by using a computer program can be easily implemented by using corresponding hardware. Moreover, a specific hardware structure used to implement a same function may be in various forms, for example, in a form of an analog circuit, a digital circuit or a dedicated circuit. However, in the embodiments, a software program implementation is a better implementation in most cases. Based on such an understanding, the solutions of the embodiments essentially or the part contributing to the prior art may be implemented in a form of a software product. The computer software product is stored in a readable storage medium, for example, a floppy disk, a USB flash drive, a removable hard disk, a ROM, a RAM, a magnetic disk or an optical disc of a computer and includes several instructions for enabling a computer device to perform the methods described in the embodiments.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedure or functions according to the embodiments are all or partially generated. The computer may be a general-purpose computer, a dedicated computer, a computer network, or another programmable apparatus.

The computer instructions may be stored in a computer-readable storage medium or may be transmitted from a computer-readable storage medium to another computer-readable storage medium. For example, the computer instructions may be transmitted from a website, computer, training set construction apparatus, computing device, or data center to another website, computer, training set construction apparatus, computing device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a training device or a data center, integrating one or more usable media. The usable medium may be a magnetic medium (for example, a floppy disk, a hard disk or a magnetic tape), an optical medium (for example, a DVD), a semiconductor medium (for example, a solid-state drive (SSD)), or the like.

It should be understood that "one embodiment" or "an embodiment" means that particular features, structures, or characteristics related to the embodiments are included in at least one embodiment. Therefore, "in one embodiment" or "in an embodiment" does not necessarily refer to a same embodiment. In addition, these particular features, structures, or characteristics may be combined in one or more embodiments in any proper manner. It should be understood that sequence numbers of the foregoing processes do not mean execution sequences in the embodiments. The execution sequences of the processes should be determined based on functions and internal logic of the processes and should not be construed as any limitation to the implementation processes of the embodiments.

In addition, the terms "system" and "network" may be used interchangeably. The term "and/or" describes only an association relationship between associated objects and represents that three relationships may exist. For example, A and/or B may represent the following three cases: only A exists, both A and B exist, and only B exists. In addition, the character "/" usually indicates an "or" relationship between the associated objects.

It should be understood that in the embodiments, "B corresponding to A" indicates that B is associated with A, and B may be determined based on A. However, it should further be understood that determining B based on A does not mean that B is determined based on A only; that is, B may alternatively be determined based on A and/or other information.

A person of ordinary skill in the art may be aware that, in combination with the examples described in the embodiments, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the solutions. A person skilled in the art may use different methods to implement the described functions for each particular application, but it should not be considered that the implementation goes beyond the scope of the embodiments.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided, it should be understood that the system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings, direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units may be integrated into one unit. The integrated unit may be implemented in a form of hardware or may be implemented in a form of a software functional unit.

When the integrated unit is implemented in the form of a software functional unit and sold or used as an independent product, the integrated unit may be stored in a computer-readable storage medium. Based on such an understanding, the solutions of the embodiments essentially, the part contributing to the prior art, or all or some of the solutions may be implemented in a form of a software product. The computer software product is stored in a storage medium and includes several instructions for enabling a computer device (which may be a personal computer, a server, a network device, or the like) to perform all or some of the steps of the method according to the embodiments.

In summary, what is described above is merely example embodiments of the solutions of the embodiments, but is not intended as limiting. Any modification, equivalent replacement, or improvement made without departing from the spirit and principle of the embodiments shall fall within the scope of the embodiments.

What is claimed is:

1. A configuration method, comprising:
   obtaining a first service requirement related to a first device;
   determining, based on the first service requirement, a first host core model and at least one component hooked to the first host core model;
   generating a first packet based on the first host core model and the at least one component; and
   configuring the first device based on the first packet;
   wherein the at least one component comprises a component model of the at least one component and a component constraint of the at least one component, wherein
      the component model comprises component information of the at least one component, and the component information comprises a component parameter and a component name; and
      the component constraint comprises a scenario to which the at least one component is applicable and a constraint of the component parameter.

2. The method according to claim 1, wherein the at least one component further comprises: a component mapping of the at least one component, wherein
   the component mapping comprises a mapping from the at least one component to the first packet.

3. The method according to claim 2, wherein the determining, based on the first service requirement, of the first host core model and at least one component hooked to the first host core model comprises:
   determining a first scenario information based on the first service requirement, wherein the first scenario information comprises the component information of the at least one component required by the first service requirement and hook point information of the first host core model required by the first service requirement, wherein the at least one component is hooked to the first host core model based on the hook point information of the first host core model; and
   determining, based on the first scenario information, the first host core model and the at least one component hooked to the first host core model.

4. The method according to claim 3, wherein before the obtaining of the first service requirement related to a first device, the method further comprises:
   determining a host core model and a component based on a service requirement;
   determining hook point information of the host core model based on the component, wherein the hook point information of the host core model comprises an insertion location of the host core model, a component name of the component, and an instantiation identity of the component;
   creating at least one scenario based on the hook point information of the host core model and component information of the component; and
   constructing a scenario set by using the at least one scenario, wherein the scenario set comprises the first scenario information.

5. The method according to claim 4, wherein the determining of the first scenario information based on the first service requirement comprises:
   determining the first scenario information in the scenario set based on the first service requirement.

6. The method according to claim 3, wherein after the determining a first scenario information based on the first service requirement, the method further comprises:
obtaining a first component parameter of the at least one component based on the component constraint of the at least one component.

7. The method according to claim 6, wherein the generating of the first packet based on the first host core model and the at least one component comprises:
generating a first component packet based on the at least one component and the first component parameter;
generating a first northbound packet based on the first component packet, the first host core model, and the hook point information of the first host core model;
generating a southbound packet framework based on a mapping relationship from the first host core model to the first device; and
generating the first packet based on the first northbound packet, the component mapping of the at least one component, and the southbound packet framework.

8. The method according to claim 3, wherein the hook point information of the first host core model is described by using any one of a name-value pair, a character string, or a bit.

9. A configuration apparatus, comprising:
at least one processor;
one or more memories coupled to the at least one processor and storing instruction which when executed by the at least one processor, cause the apparatus to:
obtain a first service requirement related to a first device;
determine, based on the first service requirement, a first host core model and at least one component hooked to the first host core model; and
generate a first packet based on the first host core model and the at least one component; and
configure the first device based on the first packet;
wherein the at least one component comprises a component model of the at least one component and a component constraint of the at least one component, wherein:
the component model comprises component information of the at least one component, and the component information comprises a component parameter and a component name; and
the component constraint comprises a scenario to which the at least one component is applicable and a constraint of the component parameter.

10. The configuration apparatus according to claim 9, wherein the at least one component further comprises a component mapping of the at least one component, wherein the component mapping comprises a mapping from the at least one component to the first packet.

11. The method according to claim 10, wherein the instructions executed by the at least one processor to further cause the apparatus to:
determine a first scenario information based on the first service requirement, wherein the first scenario information comprises the component information of the at least one component required by the first service requirement and hook point information of the first host core model required by the first service requirement, wherein the at least one component is hooked to the first host core model based on the hook point information of the first host core model; and
determine, based on the first scenario information, the first host core model and the at least one component hooked to the first host core model.

12. The configuration apparatus according to claim 11, wherein the instructions executed by the at least one processor to further cause the apparatus to:
determine a host core model and a component based on a service requirement;
determine hook point information of the host core model based on the component, wherein the hook point information of the host core model comprises an insertion location of the host core model, a component name of the component, and an instantiation identity of the component;
create at least one scenario based on the hook point information of the host core model and component information of the component; and
construct a scenario set by using the at least one scenario, wherein the scenario set comprises the first scenario information.

13. The configuration apparatus according to claim 12, wherein the instructions executed by the at least one processor to further cause the apparatus to:
determine the first scenario information in the scenario set based on the first service requirement.

14. The configuration apparatus according to claim 12, wherein the instructions executed by the at least one processor to further cause the apparatus to:
generate a first component packet based on the at least one component and the first component parameter;
generate a first northbound packet based on the first component packet, the first host core model, and the hook point information of the first host core model;
generate a southbound packet framework based on a mapping relationship from the first host core model to the first device; and
generate the first packet based on the first northbound packet, the component mapping of the at least one component, and the southbound packet framework.

15. The configuration apparatus according to claim 11, wherein the instructions executed by the at least one processor to further cause the apparatus to:
obtain a first component parameter of the at least one component based on the component constraint of the at least one component.

16. The configuration apparatus according to claim 11, wherein the hook point information of the first host core model is described by using any one of a name-value pair, a character string, or a bit.

17. A non-transitory storage medium storing a program, which when executed by one or more processors, cause the one or more processors to perform operations, the operations comprising:
obtaining a first service requirement related to a first device;
determining, based on the first service requirement, a first host core model and at least one component hooked to the first host core model;
generating a first packet based on the first host core model and the at least one component; and
configuring the first device based on the first packet;
wherein the at least one component comprises at least one a component model of the at least one component and a component constraint of the at least one component, wherein
the component model comprises component information of the at least one component, and the component information comprises a component parameter and a component name; and the component constraint comprises a scenario to which the at least one component is applicable and a constraint of the component parameter.

18. The non-transitory storage medium according to claim 17, wherein the at least one component further comprises a component mapping of the at least one component, wherein the component mapping comprises a mapping from the at least one component to the first packet.

19. The non-transitory storage medium according to claim 17, wherein the operations further comprise:
   determining a first scenario information based on the first service requirement, wherein the first scenario information comprises the component information of the at least one component required by the first service requirement and hook point information of the first host core model required by the first service requirement, wherein the at least one component is hooked to the first host core model based on the hook point information of the first host core model; and
   determining, based on the first scenario information, the first host core model and the at least one component hooked to the first host core model.

20. The non-transitory storage medium according to claim 19, wherein the operations further comprise:
   obtaining a first component parameter of the at least one component based on the component constraint of the at least one component.

* * * * *